May 2, 1950 M. LINT 2,506,371
SOD CUTTER

Filed Nov. 10, 1947 3 Sheets-Sheet 1

INVENTOR.
Merle Lint
BY Albert G. McGeen
atty.

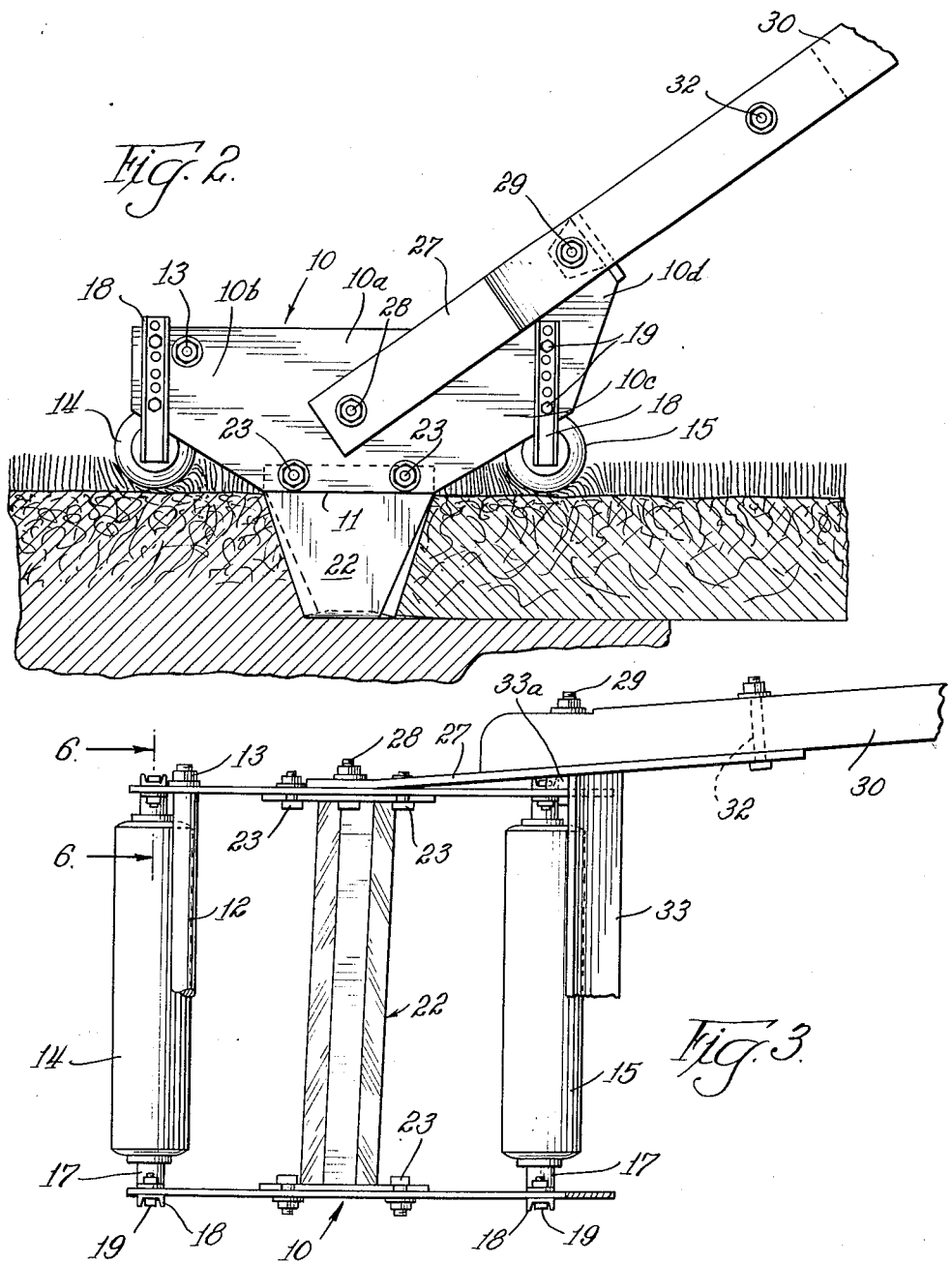

May 2, 1950 M. LINT 2,506,371
SOD CUTTER
Filed Nov. 10, 1947 3 Sheets-Sheet 3

INVENTOR.
Merle Lint
BY Albert J. McColeh
Atty.

Patented May 2, 1950

2,506,371

UNITED STATES PATENT OFFICE 2,506,371

SOD CUTTER

Merle Lint, San Diego, Calif.

Application November 10, 1947, Serial No. 784,973

3 Claims. (Cl. 97—226)

My invention contemplates and provides an implement unit of simple and rugged construction which effectively and efficiently may be manipulated by one man to cut strips of sod from lawns and golf course greens and fairways, etc. Two or more men, or one or more men and a horse or horses or tractor, have been essential to the satisfactory employment of all prior unitary sod cutters which have come to my attention.

A principal object of my invention is to provide a simple and sturdy sod cutter unit which is capable of effective easy operation by one man.

Other objects of my invention are to provide a sod cutter unit of the kind mentioned in the immediately preceding paragraph which economically may be manufactured and maintained serviceable and which readily is adjustable to cut sods of different thicknesses.

Characteristic of my new sod cutter unit, and responsible for its success as a one man operated implement, is a certain hereinafter described novel relationship between two rollers, a generally U-shaped knife, a pair of handles and a kick plate.

Other features, objects and advantages will appear from the description to follow wherein reference is made to the three accompanying sheets of drawings, wherein:

Fig. 2 is a side elevational view of my sod cutter as it appears while being propelled forwardly to cut a sod strip of predetermined depth;

Fig. 3 is a top plan view of my sod cutter with certain parts broken away to reveal parts therebeneath;

Figure 1:
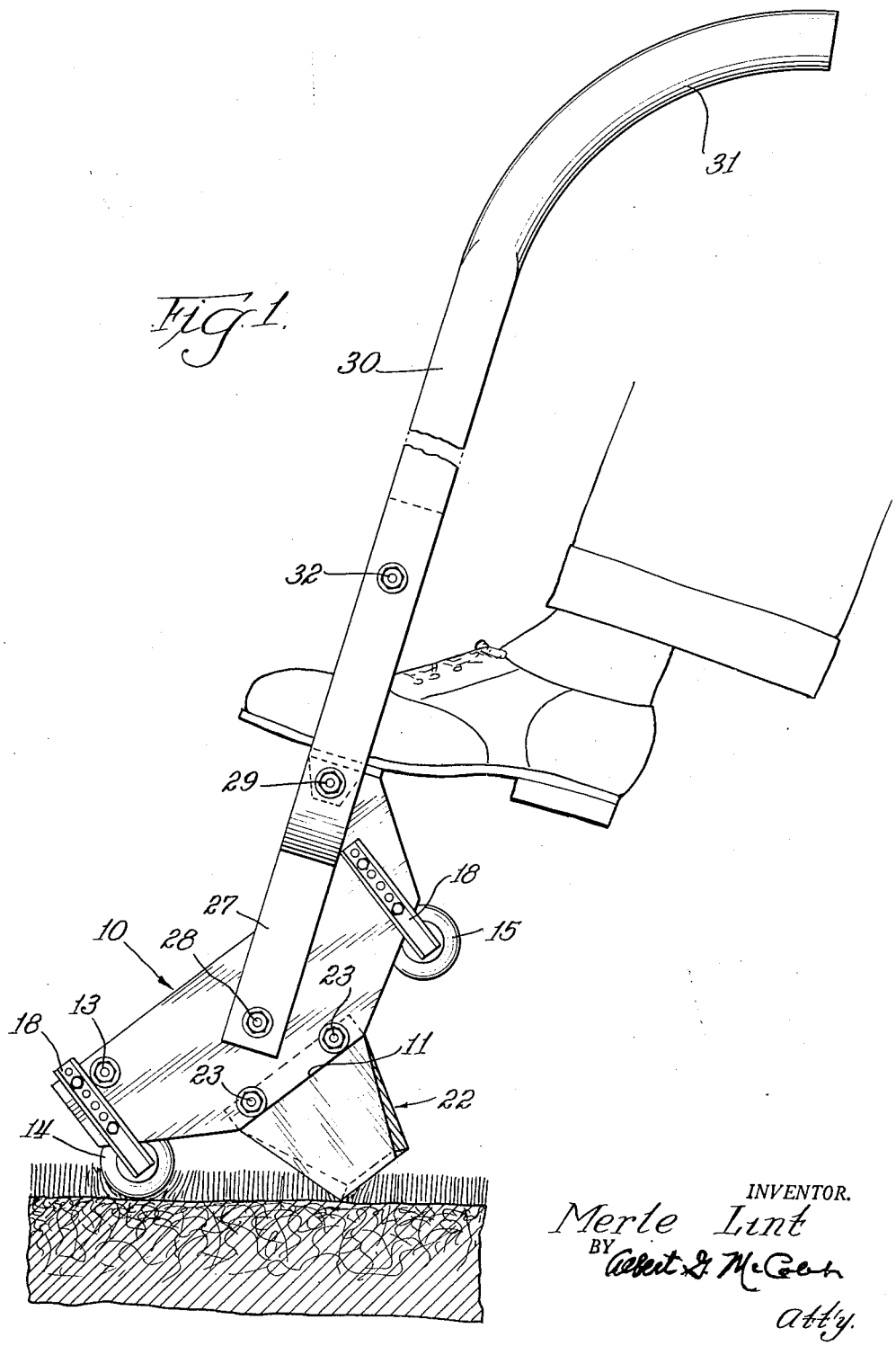
Fig. 1 is a side elevational view of my new sod cutter as it appears when about to initiate the incisions necessary to the cutting of a strip of sod.
Figure 4:
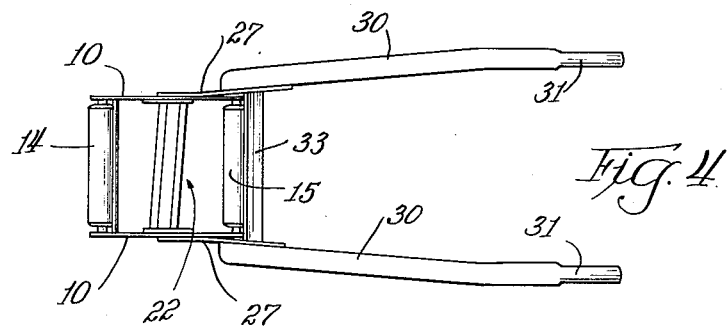
Fig. 4 is a top plan view, on reduced scale, of the sod cutter.
Figure 5:
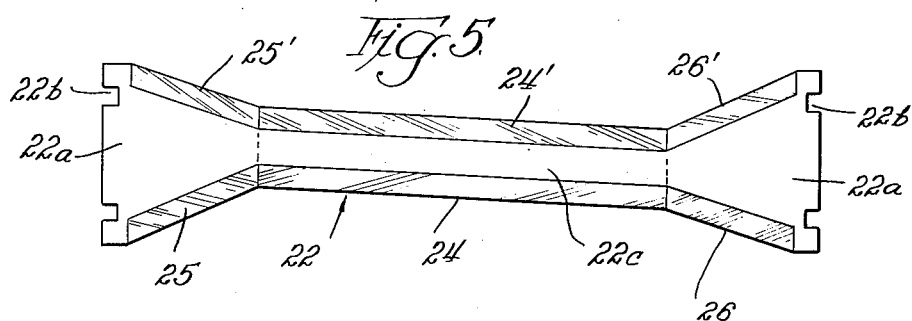
Fig. 5 is a developed view of the knife element of my sod cutter as such knife element would appear in plan if all of its parts were caused to occupy the same horizontal plane.
Figure 6:
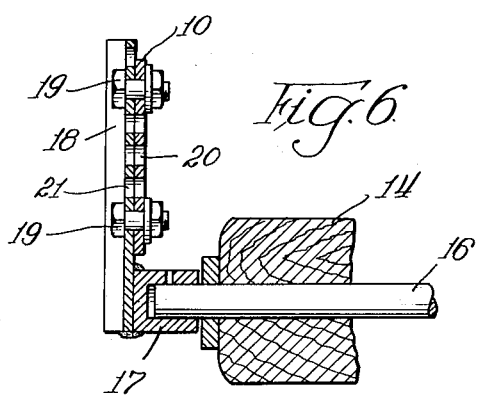
Fig. 6 is a fragmentary detail sectional view, taken on the line 6—6 of Fig. 3, of one of the bearings for one of the two rollers of the sod cutter.

In Figs. 1, 2 and 3 certain parts have been broken away to conserve space in illustration. Similar reference characters refer to similar parts throughout the several views.

The sod cutter of my invention preferably comprises a pair of parallel spaced-apart vertically disposed side plates 10—10; each such side plate comprising an intermediate portion 10a having a straight and normally horizontal lower edge 11, end portions 10b and 10c which incline upwardly, fore and aft respectively, away from such edge 11, and an upwardly and rearwardly inclined extension 10d for a purpose presently to appear.

The forward end portions 10b—10b of the side plates 10—10 are connected by a spacer rod 12 having reduced threaded extremities which extend through plates 10 to cooperate with nuts 13—13; the intermediate portions 10a of the plates are connected by the hereinafter discussed U-shaped knife; and the side plate extensions 10d—10d are connected by the hereinafter discussed kick bar; to the end that the side plates 10—10 and their associated elements may constitute a rigid and desirably light sod cutter unit.

At 14 and 15 are shown rollers which extend, respectively, between the front end portions 10b—10b and the rear end portions 10c—10c of the side plates. Each of the rollers desirably comprises a shaft 16 having its ends disposed in bearings 17—17 which underlie the adjacent upwardly inclined lower edges of the side plates and are welded or otherwise suitably secured to the lower ends of bars 18—18 which are disposed against the outer faces of the side plates 10—10 and are firmly adjustably held thereagainst by bolts 19 which extend through selected appropriate registering apertures 20 and 21 in the side plates and such bars respectively. Preparatory to cutting comparatively thick sod, the bearings 17—17 of the two rollers 14 and 15 are placed substantially as shown in the drawings; when thinner sod is to be cut, the bearings for the rollers are adjusted to and secured at positions which are lower with respect to the plates 10—10.

Connecting the intermediate portions 10a—10a of the side plates, and depending substantially below the lower edges 11—11 thereof, is a generally U-shaped knife 22. Knife 22 comprises a pair of parallel plate-like end portions 22a—22a which are disposed against the inner faces of the intermediate portions 10a—10a of the side plates and are provided in their upper surfaces with notches 22b—22b for cooperation with bolts 23—23 which extend through the side plates at positions closely adjacent to the lower edges 11—11 thereof. The lower edges of the plate-like end portions 22a—22a of the knife are joined by an integral bar-like horizontal portion 22c which has its fore and aft edges disposed obliquely to the side plates 10—10; each of such fore and aft edges of the knife portion 22c and the adjacent edges of the knife portions 22a—22a being sharpened as indicated at 24, 25 and 26, and at 24', 25' and 26'. When the sharpened edges 24, 25 and 26 of the knife, being the edges which are presented forwardly, become dull, the knife is bodily reversible, with respect to the side plates, to present forwardly the sharpened edges 24', 25' and 26'.

Carried by side plates 10—10 and diverging rearwardly and upwardly therefrom are the handle attachment bars 27—27. The forward or lower ends of these handle attachment bars 27—27 are secured to the exteriors of intermediate portions 10a—10a of the side plates by bolts 28—28. Such handle attachment bars 27—27 also are secured to the portions 10d—10d of the side plates by bolts 29—29 which extend through holes in such bars 27—27 and side plate portions 10d—10d which register with holes in the wedge-shaped ends of the kick bar presently to be discussed and with holes in the handles 30—30 which preferably are provided with suitable hand grip portions 31—31. Handles 30—30 desirably are formed of wood and are additionally secured to the bars 27—27 by bolts 32—32.

At 33 is depicted a kick plate which extends horizontally between the handle attachment bars 27—27 and is provided with wedge-shaped end portions 33a—33a. Each of these wedge-shaped end portions 33a—33a lies between one of the plate portions 10d and the adjacent handle attachment bar 27 and is provided with a hole for cooperation with one of the bolts 29 as previously explained.

The precise location and disposition of the kick plate 33 with respect to the other components of the sod cutter is important. It is so located and disposed that (a) it lies substantially directly over the knife 22, with its foot engageable surface occupying a plane only slightly inclined if at all to the horizontal, when the sod cutter is up-tilted at its rear to be supported by roller 14 and knife 22 upon a turf from which sod is to be cut, and (b) it lies above the roller 15, and substantially behind the knife 22, with its foot engageable surface occupying a plane inclined at substantially 45 degrees to the horizontal when the sod cutter is being supported by both of the rollers upon a turf from which sod is being cut as the result of forward movement of the sod cutter.

A single operator, in utilizing the sod cutter of my invention to cut a strip of sod from any suitable turf, proceeds as follows: With the side plates 10—10 extending in the direction of the strip of sod to be cut, the sod cutter is up-tilted at its rear end so that it is supported upon the turf by the roller 14 and the knife 22 as illustrated in Fig. 1. Then, with his hands grasping the handle portions 31—31, the operator places one foot upon the kick plate 33 and presses it firmly downwardly to cause the forwardly presented sharpened edges of the knife to enter the turf. The knife, turning about the axis of roller 14, eventually reaches the position depicted in Fig. 2, at which time the roller 15 also rests upon the turf from which the sod is to be cut. A strip of sod is then cut from the turf by propelling the sod cutter forwardly with the aid of handles 30, the kick plate being employed whenever required to supplement the propelling effort which the operator exerts through the handles 30. As the sod cutter thus travels over the turf, the strip of sod being severed from the turf is undercut by the forwardly presented sharpened edge of the knife part 22c and has its longitudinal edges severed from the adjacent turf by the forwardly presented edges of the knife parts 22a—22a.

Having thus illustrated and described a preferred embodiment of my invention, what I claim as new and desire to secure by Letters Patent of the United States is:

1. A sod cutter, for operation by the hands and one foot of one man, comprising in combination: a frame; handle means connected with and extending upwardly and rearwardly from the frame in all operating positions of the frame; fore and aft supporting rollers carried by and extending horizontally transversely of the frame; a generally U-shaped knife located between the rollers and extending transversely of the frame with the web portion of the knife lying substantially lower than the rollers when the rollers are both riding upon a level turf, the leg portions of said U-shaped knife extending upwardly from its web portion to the frame for securement thereto, said web portion having a forwardly presented edge adapted to undercut a sod strip and said leg portions having forwardly presented edges adapted to sever such a strip from adjacent turf; an elongated kick plate located rearwardly of the knife, and above both rollers in all operating positions of the frame and fixed relatively to the frame, said kick plate occupying a plane that is inclined forwardly and upwardly when both rollers are riding upon level turf; the vertical and horizontal distances between the lowermost portion of the front roller and the forwardly presented edge of the web portion of the knife, and the vertical and horizontal distances between the kick plate and such forwardly presented edge of the web portion of the knife, being so related when both rollers are riding upon level turf that any straight line extending through the rear edge of the kick plate and at right angles to the plane of the kick plate also passes in front of the forwardly presented edge of the web portion of the knife and behind the turf engaging portion of the front roller, and so related when the frame is rearwardly uptilted to be carried on level turf by the front roller and the knife that the kick plate is located substantially directly above the knife and any straight line extending through the rear edge of the kick plate at right angles to the plane of the kick plate passes in front of the forwardly presented edge of the web portion of the knife and behind the turf engaging portion of the front roller.

2. A sod cutter as recited in claim 1 wherein the frame comprises a pair of parallel spaced apart vertically disposed side plates and the handle means comprises a pair of handle attachment bars each having one end thereof secured to the exterior surface of one of the side plates and diverging from such surface to extend upwardly and rearwardly from the side plate, and the kick plate is provided with wedge shaped end portions, each of said wedge shaped end portions being disposed and secured between one of the handle attachment bars and the side plate from which such bar diverges.

3. A sod cutter, for operation by the hands and one foot of one man, comprising in combination: a frame; handle means connected with and extending upwardly and rearwardly from the frame in all operating positions of the frame; fore and aft supporting rollers carried by and extending horizontally transversely of the frame; a generally U-shaped knife located between the rollers and extending transversely of the frame with the web portion of the knife lying substantially lower than the rollers when the rollers are both riding upon a level turf, the leg portions of said U-shaped knife extending upwardly from its web portion to the frame for securement to the frame, said web portion having a forwardly presented edge adapted to undercut a sod strip and said leg portions having forwardly presented edges adapted to sever such a strip from adjacent turf; an elongated kick plate located rearwardly of the knife and fixed relatively to the frame, said kick plate occupying a plane that is inclined forwardly and upwardly when both rollers are riding upon level turf; said kick plate being located substantially directly above the rear roller when both rollers are riding upon level turf and being located substantially directly above the forwardly presented edge of the web portion of the knife when the frame is rearwardly uptilted to be supported on level turf by the front roller and the knife, whereby initial penetration of a turf by the knife effectively may be accomplished spade-wise by downwardly directed pressure of an operator's foot upon the kick plate when the frame is rearwardly uptilted and supported as aforesaid, and whereby pressure of the operator's hands upon the handle means effectively may be added by a series of kicks delivered to the kick plate in propelling the frame forwardly while the knife is undercutting a sod strip and severing it from the adjacent turf.

MERLE LINT.

REFERENCES CITED

The following references are of record in the file of this patent:

UNITED STATES PATENTS

| Number | Name | Date |
|---|---|---|
| 45,926 | Kirk | Jan. 17, 1865 |
| 549,730 | Lane | Nov. 12, 1895 |

FOREIGN PATENTS

| Number | Country | Date |
|---|---|---|
| 110,527 | Australia | May 16, 1940 |